US012564196B2

(12) United States Patent
Martin et al.

(10) Patent No.: US 12,564,196 B2
(45) Date of Patent: Mar. 3, 2026

(54) SMOKE FUNCTIONALITY IN ELECTRIC GRILL-TYPE APPLIANCE

(71) Applicant: SHARKNINJA OPERATING LLC, Needham, MA (US)

(72) Inventors: Christopher T. Martin, North Attleboro, MA (US); Christopher Smith, Newton, MA (US); John M. Steinmetz, Philadelphia, PA (US); Joshua D. Anthony, North Billerica, MA (US)

(73) Assignee: SharkNinja Operating LLC, Needham, MA (US)

( * ) Notice: Subject to any disclaimer, the term of this patent is extended or adjusted under 35 U.S.C. 154(b) by 458 days.

(21) Appl. No.: 17/138,580

(22) Filed: Dec. 30, 2020

(65) Prior Publication Data

US 2022/0202027 A1    Jun. 30, 2022

(51) Int. Cl.
*A47J 37/07*          (2006.01)
*A23B 4/052*          (2006.01)
(Continued)

(52) U.S. Cl.
CPC .............. *A23B 4/052* (2013.01); *A47J 36/32* (2013.01); *A47J 36/36* (2013.01); *A47J 37/0641* (2013.01); *A47J 37/0709* (2013.01); *A47J 37/0754* (2013.01); *A47J 37/079* (2013.01); *F23Q 7/02* (2013.01); *F24B 5/087* (2013.01); *F24C 1/04* (2013.01); *A23V 2002/00* (2013.01); *A47J 37/0786* (2013.01)

(58) Field of Classification Search
CPC . A23B 4/052; A47J 36/32; A47J 37/36; A47J 37/0709; A47J 37/0754; A47J 37/079; F23Q 7/02; F24C 1/04; F24B 5/087
See application file for complete search history.

(56) References Cited

U.S. PATENT DOCUMENTS

| | | | |
|---|---|---|---|
| 2,205,914 A | 6/1940 | Stafford | |
| RE30,751 E * | 9/1981 | Castelli | ................. A45C 11/00 220/837 |

(Continued)

FOREIGN PATENT DOCUMENTS

| | | |
|---|---|---|
| CN | 201039937 Y | 3/2008 |
| CN | 202739766 U | 2/2013 |

(Continued)

OTHER PUBLICATIONS

U.S. Appl. No. 17/139,607, filed Dec. 31, 2020, Smoke Functionaligy in Electric Grill-Type Appliance.

(Continued)

*Primary Examiner* — Tiffany T Tran
(74) *Attorney, Agent, or Firm* — Mintz, Levin, Cohn, Ferris, Glovsky and Popeo, P.C.

(57) ABSTRACT
A cooking system includes a housing having a hollow interior, a heating element operable to heat to said hollow interior, a food support surface arranged within said hollow interior, and a combustible substrate module removably positionable in said housing. When positioned in the housing, the combustible substrate module is arranged in fluid communication with the hollow interior and the combustible substrate module is disposed remote of the food support surface.

12 Claims, 8 Drawing Sheets

(51) Int. Cl.

| | |
|---|---|
| *A47J 36/32* | (2006.01) |
| *A47J 36/36* | (2006.01) |
| *A47J 37/06* | (2006.01) |
| *F23Q 7/02* | (2006.01) |
| *F24B 5/08* | (2006.01) |
| *F24C 1/04* | (2021.01) |

(56) References Cited

U.S. PATENT DOCUMENTS

| | | | |
|---|---|---|---|
| 6,019,035 A * | 2/2000 | Jonas | A23B 4/052 |
| | | | 126/25 R |
| 6,035,770 A | 3/2000 | Whitefield | |
| 6,059,849 A * | 5/2000 | Lewis | A23B 4/0526 |
| | | | 44/590 |
| 6,257,130 B1 | 7/2001 | Schlosser | |
| 6,841,759 B2 | 1/2005 | Elwedini | |
| 7,317,173 B2 | 1/2008 | Bartelick et al. | |
| 7,694,626 B2 | 4/2010 | Davis | |
| 7,703,389 B2 | 4/2010 | McLemore et al. | |
| 7,757,604 B2 | 7/2010 | Gonzalez | |
| 8,042,459 B2 | 10/2011 | Wu | |
| 8,381,636 B2 | 2/2013 | Liu | |
| 8,997,639 B2 | 4/2015 | Adams et al. | |
| 9,486,000 B2 | 11/2016 | Kaderli | |
| 10,021,898 B2 | 7/2018 | Mafi | |
| 10,051,897 B2 | 8/2018 | Freddi et al. | |
| 10,149,573 B2 | 12/2018 | Volatier et al. | |
| 10,426,176 B2 | 10/2019 | Dixon et al. | |
| 10,588,457 B2 | 3/2020 | Hingorani | |
| 2004/0025714 A1 | 2/2004 | Neal et al. | |
| 2004/0226550 A1 | 11/2004 | Hutton et al. | |
| 2006/0011192 A1 | 1/2006 | Citrynell et al. | |
| 2006/0113294 A1 * | 6/2006 | LoMaglio | A47J 39/006 |
| | | | 219/400 |
| 2006/0137543 A1 | 6/2006 | McLemore et al. | |
| 2008/0230044 A1 | 9/2008 | Warner | |
| 2013/0213243 A1 | 8/2013 | Borovicka et al. | |
| 2014/0216274 A1 | 8/2014 | Ahmed | |
| 2014/0261015 A1 | 9/2014 | Nelson | |
| 2016/0235079 A1 | 8/2016 | Singleterry | |
| 2017/0164783 A1 | 6/2017 | Sauerwein et al. | |
| 2017/0164784 A1 | 6/2017 | Rummel et al. | |
| 2017/0311615 A1 | 11/2017 | King | |
| 2018/0064286 A1 * | 3/2018 | Nernberger | A47J 37/0635 |
| 2018/0325132 A1 * | 11/2018 | Nitta | A23C 19/14 |
| 2018/0353007 A1 * | 12/2018 | Eberhart | A47J 37/0641 |
| 2019/0082887 A1 * | 3/2019 | Farrell | F24B 15/005 |
| 2019/0254476 A1 * | 8/2019 | Anthony | A47J 37/0641 |
| 2019/0290064 A1 * | 9/2019 | Colston | A23B 4/0523 |
| 2019/0320669 A1 * | 10/2019 | Powell | A47J 37/0629 |
| 2020/0054032 A1 | 2/2020 | Garces et al. | |
| 2020/0187710 A1 | 6/2020 | Guo et al. | |
| 2020/0196798 A1 | 6/2020 | Boltz et al. | |
| 2020/0214304 A1 * | 7/2020 | Garces | A23B 4/052 |
| 2020/0305450 A1 | 10/2020 | Halasinski et al. | |
| 2020/0315400 A1 * | 10/2020 | Mansueto | F24B 13/004 |
| 2020/0383340 A1 * | 12/2020 | Larson | A23B 4/0523 |
| 2021/0123601 A1 | 4/2021 | Martin et al. | |
| 2021/0145012 A1 * | 5/2021 | Hoodenpyl | A23B 4/0523 |
| 2023/0213206 A1 * | 7/2023 | Kim | H05B 6/6482 |

FOREIGN PATENT DOCUMENTS

| | | | | |
|---|---|---|---|---|
| CN | 101309592 B | 4/2013 | | |
| CN | 203328547 U | 12/2013 | | |
| CN | 203328551 U | 12/2013 | | |
| CN | 104337382 A | 2/2015 | | |
| CN | 105167640 A | 12/2015 | | |
| CN | 204889716 U | 12/2015 | | |
| CN | 104010554 B | 5/2016 | | |
| CN | 105662170 A | 6/2016 | | |
| CN | 206062956 U | 4/2017 | | |
| CN | 206102454 U | 4/2017 | | |
| CN | 206151287 U | 5/2017 | | |
| CN | 206166602 U | 5/2017 | | |
| CN | 206295269 U | 7/2017 | | |
| CN | 106998963 A | 8/2017 | | |
| CN | 206371939 U | 8/2017 | | |
| CN | 206507805 U | 9/2017 | | |
| CN | 206507806 U | 9/2017 | | |
| CN | 107683091 A | 2/2018 | | |
| CN | 206979387 U | 2/2018 | | |
| CN | 108185836 A | 6/2018 | | |
| CN | 207640242 U | 7/2018 | | |
| CN | 108366698 A | 8/2018 | | |
| CN | 207734057 U | 8/2018 | | |
| CN | 207907285 U | 9/2018 | | |
| CN | 208510814 U | 2/2019 | | |
| CN | 208524636 U | 2/2019 | | |
| CN | 208524651 U | 2/2019 | | |
| CN | 208573488 U | 3/2019 | | |
| CN | 208590918 U | 3/2019 | | |
| CN | 109662607 A | 4/2019 | | |
| CN | 209300859 U | 8/2019 | | |
| CN | 209360441 U | 9/2019 | | |
| CN | 209377377 U | 9/2019 | | |
| CN | 209826361 U | 12/2019 | | |
| CN | 211212757 U | 8/2020 | | |
| CN | 211372488 U | 8/2020 | | |
| CN | 211795985 U | 10/2020 | | |
| CN | 216602537 U | 5/2022 | | |
| WO | 2005112650 A1 | 12/2005 | | |
| WO | 2014204848 A1 | 12/2014 | | |
| WO | 2017033388 A1 | 3/2017 | | |
| WO | 2017201567 A1 | 11/2017 | | |
| WO | 2018208919 A1 | 11/2018 | | |
| WO | WO-2018198867 A1 * | 11/2018 | | A23B 4/052 |
| WO | 2019095132 A1 | 5/2019 | | |
| WO | 2020139853 A1 | 7/2020 | | |

OTHER PUBLICATIONS

International Search Report and Written Opinion for Application No. PCT/US2021/064491, mailed on Apr. 11, 2022, 11 pages.
European Search Report received for EP Patent Application No. 21916227.8, mailed on Sep. 24, 2024, 5 pages.

* cited by examiner

SMOKE FUNCTIONALITY IN ELECTRIC GRILL-TYPE APPLIANCE

FIELD

Embodiments of the present disclosure relate generally to a cooking system, and more particularly, to a smoking module for imparting a smoke flavor onto one or more food items being cooked within the cooking system.

BACKGROUND

The use of smoke in cooking applications can impart desirable flavors to one or more food items. Existing systems used to achieve such a flavor include stand-alone smokers. However, such devices can be bulky and expensive. In order to smoke food using a stand-alone smoker, a user must have adequate space to store and operate the smoker. Further, many users may only occasionally desire to smoke food. As a result, owning a dedicated smoke may be economically or physically impractical if such a device is only going to be used intermittently.

Electric countertop cooking systems are common and allow a user to perform a variety of cooking operations using only a single device. There is therefore a need to develop a device that allows a user to achieve this same smoke flavoring when cooking food using an electric countertop cooking appliance.

BRIEF DESCRIPTION

According to an embodiment, a cooking system includes a housing having a hollow interior, a heating element operable to heat to said hollow interior, a food support surface arranged within said hollow interior, and a combustible substrate module removably positionable in said housing. When positioned in the housing, the combustible substrate module is arranged in fluid communication with the hollow interior and the combustible substrate module is disposed remote of the food support surface.

In addition to one or more of the features described above, or as an alternative, in further embodiments housing further comprises a base and a lid, said combustible substrate module being removably positionable in said lid.

In addition to one or more of the features described above, or as an alternative, in further embodiments comprising an ignition source disposed within said housing, wherein when said combustible substrate module is positioned in said housing, said ignition source is operably coupled to an ignition region of said combustible substrate module.

In addition to one or more of the features described above, or as an alternative, in further embodiments said ignition source is separate from said heating element.

In addition to one or more of the features described above, or as an alternative, in further embodiments said heating element is said ignition source.

In addition to one or more of the features described above, or as an alternative, in further embodiments said portion of said combustible substrate module is separated from said ignition source by a gap.

In addition to one or more of the features described above, or as an alternative, in further embodiments comprising a radiation shield arranged between said ignition source and said combustible substrate module, said radiation shield having an opening located directly adjacent said ignition region of said combustible substrate module.

In addition to one or more of the features described above, or as an alternative, in further embodiments said cooking system further comprises a lid movable relative to said housing, said combustible substrate module being associated with said lid and said at least one of said ignition source being disposed within said lid.

In addition to one or more of the features described above, or as an alternative, in further embodiments said cooking system further comprises an air movement mechanism associated with said hollow interior and said combustible substrate module is arranged radially outward of and downstream from an outlet of said air movement mechanism.

In addition to one or more of the features described above, or as an alternative, in further embodiments said combustible substrate module further comprises a body including a hollow interior having at least one compartment.

In addition to one or more of the features described above, or as an alternative, in further embodiments comprising at least one divider arranged within said hollow interior to define a first compartment and a second compartment.

In addition to one or more of the features described above, or as an alternative, in further embodiments said divider includes a plurality of openings such that said first compartment and said second compartment are arranged in fluid communication via said plurality of openings.

In addition to one or more of the features described above, or as an alternative, in further embodiments said combustible substrate module further comprises a lid movable relative to said body to selectively close said hollow interior.

According to an embodiment, a comestible substrate module for use in an electric cooking system includes a body having at least one ignition opening and at least one outlet opening, and a hollow interior defined within the body and including at least a first compartment and a second compartment. A configuration of the first compartment is selected to generate a first amount of smoke and a configuration of the second compartment is selected to generate a second amount of smoke greater than the first amount of smoke.

In addition to one or more of the features described above, or as an alternative, in further embodiments said configuration of said first compartment is selected to generate smoke for less than or equal to about 20 minutes.

In addition to one or more of the features described above, or as an alternative, in further embodiments said configuration of said second compartment is selected to generate smoke for at least an hour.

In addition to one or more of the features described above, or as an alternative, in further embodiments said configuration of said second compartment is selected to generate smoke for up to two hours.

In addition to one or more of the features described above, or as an alternative, in further embodiments at least one dimension of said first compartment is different than at least one dimension of said second compartment.

In addition to one or more of the features described above, or as an alternative, in further embodiments a length of said first compartment is less than a length of said second compartment.

In addition to one or more of the features described above, or as an alternative, in further embodiments a height of said first compartment, measured perpendicularly from a plane of a base of said body, is greater than a height of said second compartment.

In addition to one or more of the features described above, or as an alternative, in further embodiments said at least one ignition opening is formed in said body adjacent said first compartment.

In addition to one or more of the features described above, or as an alternative, in further embodiments said at least one ignition opening is formed in said body at a height above said second compartment.

In addition to one or more of the features described above, or as an alternative, in further embodiments said first compartment and said second compartment are separated by a divider.

In addition to one or more of the features described above, or as an alternative, in further embodiments said divider has a plurality of openings such that said first compartment and said second compartment are arranged in fluid communication.

According to an embodiment, a cooking system includes a housing having a hollow interior, a combustible substrate module removably positionable in the housing and containing a combustible material, and an ignition source arranged within the hollow interior and operably coupled to the combustible substrate module. Operation of the ignition source is controlled in response to a status of the combustible material.

In addition to one or more of the features described above, or as an alternative, in further embodiments said ignition source is deenergized in response to determining that said combustible material within said combustible substrate module is ignited.

In addition to one or more of the features described above, or as an alternative, in further embodiments comprising a sensor operable to determine when said combustible material is ignited, wherein said operation of said ignition source is controlled in response to said sensor.

In addition to one or more of the features described above, or as an alternative, in further embodiments said sensor is a temperature sensor.

In addition to one or more of the features described above, or as an alternative, in further embodiments said sensor is positioned relative to said combustible substrate module to distinguish between heat generated by said ignition source and heat generated by said ignited combustible material.

In addition to one or more of the features described above, or as an alternative, in further embodiments said sensor is positioned within an interior of said combustible substrate module.

In addition to one or more of the features described above, or as an alternative, in further embodiments said ignition source is energized in response to determining that said combustible material within said combustible substrate has fully combusted.

In addition to one or more of the features described above, or as an alternative, in further embodiments said ignition source is a heating element operable to heat said hollow interior.

In addition to one or more of the features described above, or as an alternative, in further embodiments comprising a heating element distinct from said ignition source, wherein operation of said heating element is controlled in response to a status of said combustible material.

In addition to one or more of the features described above, or as an alternative, in further embodiments said heating element is energized in response to determining that said combustible material within said combustible substrate module is ignited.

In addition to one or more of the features described above, or as an alternative, in further embodiments said heating element is energized in response to determining that said combustible material within said combustible substrate has fully combusted.

In addition to one or more of the features described above, or as an alternative, in further embodiments said housing further comprises a base and a lid, said heating element being arranged within said base.

In addition to one or more of the features described above, or as an alternative, in further embodiments said housing further comprises a base and a lid, said heating element being arranged within said lid.

In addition to one or more of the features described above, or as an alternative, in further embodiments comprising an air movement device, said air movement device being controlled in response to a status of said combustible material.

In addition to one or more of the features described above, or as an alternative, in further embodiments said air movement device is rotated in response to determining that said combustible material within said combustible substrate module is ignited.

According to an embodiment, a cooking system includes a housing having a hollow interior, a combustible substrate module removably positionable in the housing and containing a combustible material, and an ignition source arranged within said hollow interior and operably coupled to the combustible substrate module. An air movement device is arranged within the hollow interior. Operation of the air movement device is controlled in response to a status of said combustible material.

In addition to one or more of the features described above, or as an alternative, in further embodiments said air movement device is energized in response to determining that said combustible material within said combustible substrate module is ignited.

In addition to one or more of the features described above, or as an alternative, in further embodiments comprising a sensor operable to determine when said combustible material is ignited, wherein said operation of said air movement device is controlled in response to said sensor.

In addition to one or more of the features described above, or as an alternative, in further embodiments said sensor is a temperature sensor.

In addition to one or more of the features described above, or as an alternative, in further embodiments said sensor is positioned relative to said combustible substrate module to distinguish between heat generated by said ignition source and heat generated by said ignited combustible material.

In addition to one or more of the features described above, or as an alternative, in further embodiments said sensor is positioned within an interior of said combustible substrate module.

In addition to one or more of the features described above, or as an alternative, in further embodiments operation of said air movement device is controlled to modulate a rate of burn of said combustible material.

In addition to one or more of the features described above, or as an alternative, in further embodiments a rotational speed of said air movement device is controlled to modulate said burn rate of said combustible material.

In addition to one or more of the features described above, or as an alternative, in further embodiments said rotational speed of said air movement device is increased to quicken said burn rate.

In addition to one or more of the features described above, or as an alternative, in further embodiments said rotational speed of said air movement device is decreased to slow said burn rate.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
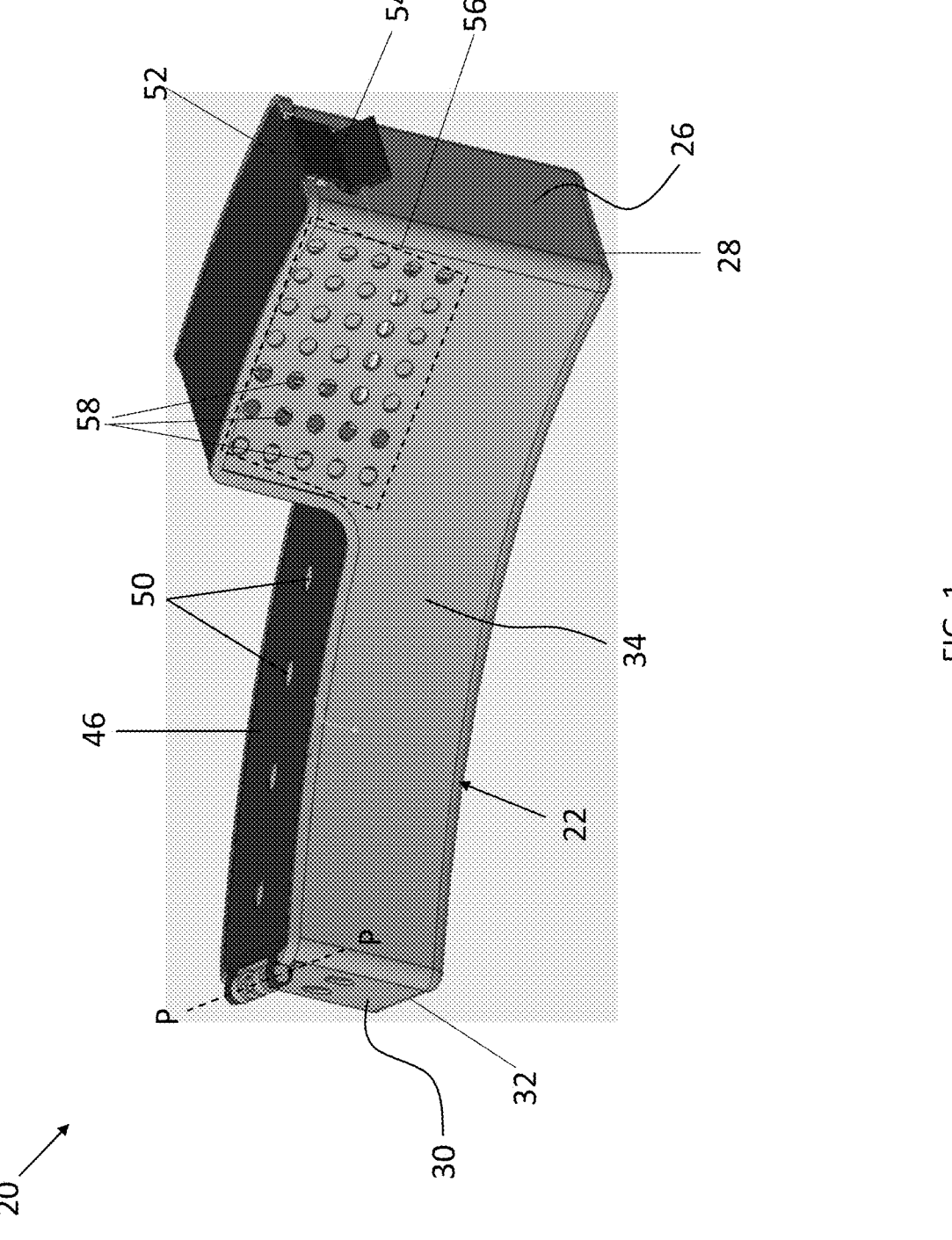
FIG. 1 is a perspective view of a smoke module for use in an electric cooking system according to an embodiment.
Figure 2:
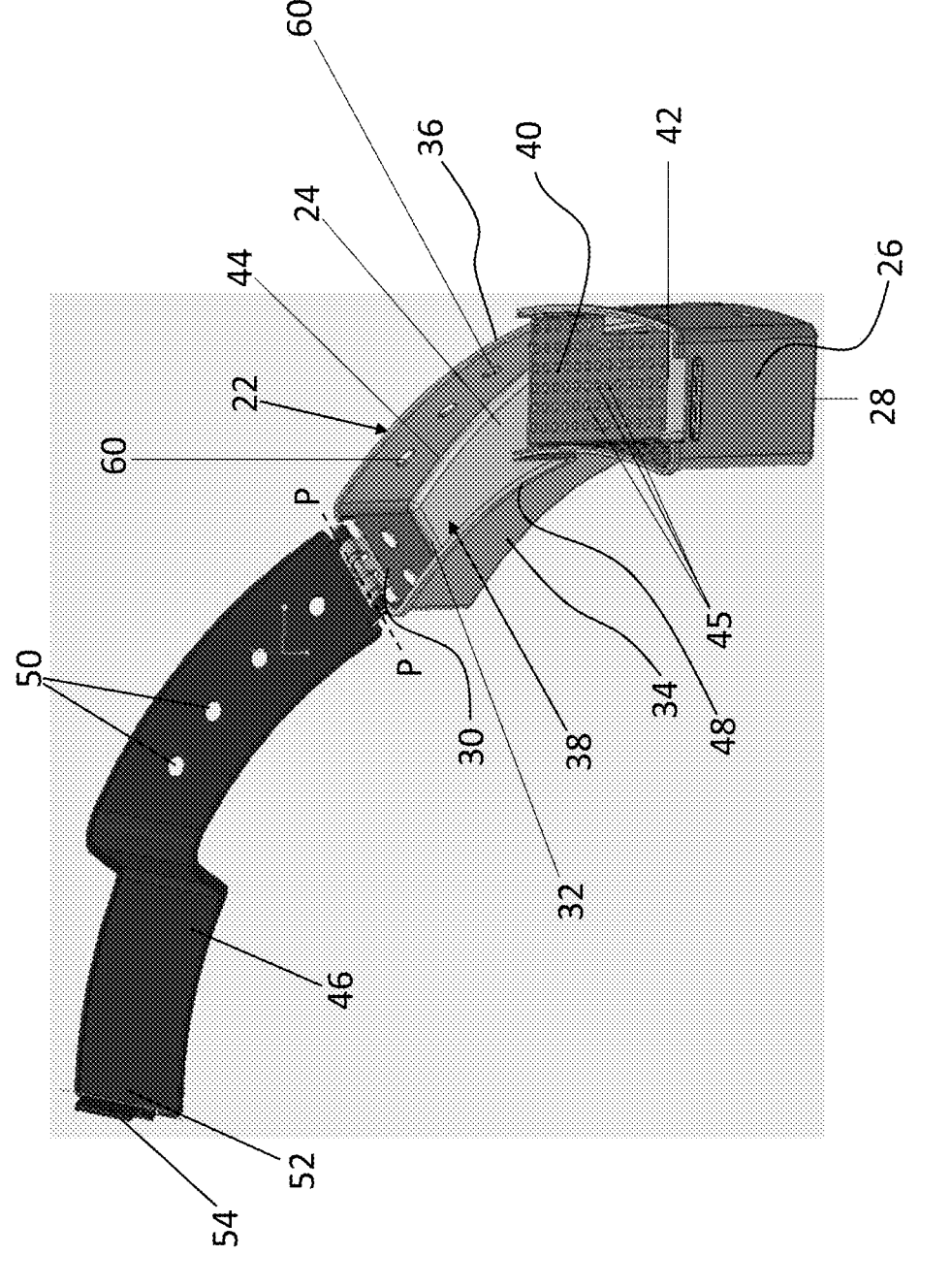
FIG. 2 is another perspective view of the smoke module of FIG. 1 according to an embodiment.

With reference now to FIGS. 1-2, an example of a combustible substrate module 20 is illustrated. As shown, the combustible substrate module 20 includes a body 22 formed from a heat-conductive material, such as metal for example. In the illustrated, non-limiting embodiment, the body 22 has a base 24, a first end wall 26 extending from a first end 28 of the base 24 in a first direction, a second end wall 30 extending from a second, opposite end 32 of the base 24 in the same first direction, and a first and second sidewall 36, 38 connected to the base 24 and extending between the first and second end walls 26, 30. In the illustrated embodiment, the first sidewall 34 and the second sidewall 36 are arranged generally parallel to one another; however embodiments where the walls have different configurations and orientations are also within the scope of the disclosure.

The body 22 may have a shape complementary to a portion of a cooking system configured to receive the module 20. In an embodiment, the module 20 is positionable adjacent a generally circular component of a cooking system, to be described in more detail below. For example, in the illustrated, non-limiting embodiment, the first sidewall 34 configured to face and/or contact a component of the cooking system, has a generally arcuate contour. As a result, the first end wall 26 is arranged at an angle to the second end wall 30. Although the body 22 is illustrated as having a curvature of less than 90 degrees, embodiments where the curvature is ninety degrees (and therefore the end walls 26, 30 are oriented generally perpendicular to one another, and embodiments where the curvature of the body 22 is greater than ninety degrees are also within the scope of the disclosure. Further, it should be understood that embodiments of the module 20 where the body 22 has another configuration are also contemplated herein.

Together, the base 24, end walls 26, 30, and sidewalls 34, 36 cooperate to define a hollow internal cavity 38. One or more dividers 40 may be arranged within the cavity 38 to partition the cavity 38 into a plurality of distinct compartments. In the illustrated, non-limiting embodiment, a single divider 40 is arranged within the cavity 38 to form two compartments 42, 44; however, it should be understood that in other embodiments, two or more dividers 40 may be located within the cavity 38, to form three or more compartments. In the illustrated, non-limiting embodiment, the divider 40 is formed from a material having one or more openings 45 therein, such as a mesh or stamped sheet metal for example. Accordingly, the compartments 42, 44 disposed on opposite sides of the divider 40 are arranged in fluid communication with one another via the one or more openings 45. However, embodiments where at least one divider 40 is formed at least partially from a solid material such that the adjacent compartments 42, 44 are not fluidly connected are also within the scope of the disclosure.

In an embodiment, one of the compartments of the module, such as the first compartment 42 for example is configured to generate a perfume smoke. The term "perfume smoke" as used herein is intended to described smoke that is used in conjunction with high heat grilling to imbue a smoke aroma and flavor into a food being cooked. This perfume smoke is configured to impart flavor to foods in a manner similar to a conventional charcoal grill. Alternatively, or in addition, one of the compartments of the module 20, such as the second compartment 44 for example, is configured to generate a low-and-slow smoke. A "low-and-slow smoke" as used herein is smoke that is used to cook food slowly and for longer durations of time, such as at least 30 minutes and up to about 2 hours. This low-and-slow smoke is intended to achieve a tender meat, similar to food cooked using a barbeque pit.

Accordingly, the configuration of the plurality of compartments 42, 44 may vary based on the smoke intended to be generated within the compartment 42, 44. For example, one or more of the dimensions of the compartments 42, 44 may vary. In an embodiment, the height of the body 22, measured perpendicularly from the plane of the base 24, varies between the first compartment 42 and the second compartment 42. In the illustrated, non-limiting embodiment, the first compartment 42 located adjacent the first end wall 26 has a first height and the second compartment 44 located adjacent the second end wall 30 has a second height, less than the first height. Accordingly, the height of the first end wall 26 is greater than the height of the second end wall 30, and the height of each of the sidewalls 34, 36 varies between the first end wall 26 and the second end wall 30. In an embodiment, the height of the sidewalls varies such that each compartment 42, 44 has a substantially constant height over its length. Alternatively, or in addition, a length of the compartments 42, 44 may vary. In an embodiment, the length of the first compartment 42, measured along the average radius of curvature for example, is shorter than the length of the second compartment 44. Embodiments where the width of the compartments 42, 44 varies are also contemplated herein.

In an embodiment, the volume of the second compartment 44 is greater than the volume of the first compartment 42. For example, the volume of the second compartment 44 may be at least 30% greater than the volume of the first compartment 42, such as at least 40% greater, at least 50%, at least 60% greater, at least 70% greater, at least 80% greater, at least 90% greater, and at least 100% greater than the volume of the first compartment 42. This larger volume is intended to store a sufficient amount of substrate to generate smoke for at least an hour, and in some embodiments more than an hour, such as 90 minutes, two hours, or longer than two hours for example. However, embodiments where the volume of the second compartment 44 is equal to or less than the volume of the first compartment 42 are also within the scope of the disclosure. In an embodiment, the volume of the first compartment 42 is about 30 mL or approximately ⅛ cup.

The module 20 may include a lid 46 connectable to a surface of body 22 to close of entry into the internal cavity 38 of body 22. In embodiments where the upper surface 48 of the body 22 has a non-planar configuration, such as due to the varying height of the compartments 42, 44 for example, the lid 46 may be contoured to cover, and in some embodiments contact, the entire upper surface 48 of the body 22. Further, the lid 46 may be substantially solid such that fluid is not configured to flow from the internal cavity 38 of the body 22 through the lid 46. However, in an embodiment, one or more openings 50 may be formed in the lid 46. The openings 50 may be disposed at a position adjacent only a portion of the compartments formed in the interior of the body 22, such as the second compartment 44 for example, or alternatively, with each of the compartments of the body 22.

The lid 46 is movable relative to the body 22 between an open position (FIG. 2), in which the compartments 42, 44 are accessible or exposed, and a closed position (FIG. 1) to selectively cover the interior cavity 38. The lid 46 may be distinct and separable from the body 22, or alternatively, may be movably connected to the body 22. In the illustrated, non-limiting embodiment of FIG. 2, the lid 46 is pivotable or rotatable relative to the body 22 about a pivot axis P. However, other types or movement of the lid 46 are also within the scope of the disclosure. In an embodiment, the lid 46, such as the end 52 of the lid 46 opposite the hinge for example, includes a connector 54 configured to cooperate with an engagement feature 54 formed in the body 22 to restrict movement of the lid 46 relative to the body 22 when in the closed position.

In an embodiment, an ignition region or zone 56 is formed at a portion of the body 22 specific to only one of the compartments of the body 22. As a result, the initial ignition of the contents of the module 20 is isolated to a single compartment of the body 22. In such embodiments, the ignition region 56 is not formed in a sidewall 34, 36 at a height that is shared by both compartments 42, 44. Rather, in the illustrated, non-limiting embodiment best shown in FIG. 1, the ignition region 56 is formed in the first sidewall 34 adjacent the first compartment 42 at a height above the height of the second compartment 44. In addition, a plurality of ignition openings 58 are formed in the ignition region 56 of the body 22. The ignition openings 58 may be substantially identical, or alternatively may vary in size. Further, the ignition openings located over the entire ignition region 56 or may be formed at only a portion of the ignition region 56. In an embodiment, the ignition region 56 is formed by a mesh material connected to or integrated into the body 22. However, in other embodiments, the ignition openings 58 are formed, such as stamped or punched into the material of the sidewall 34. The ignition openings 58 are sized and position within the ignition region 56 to allow radiant heat to flow through the ignition openings 58 for interaction with a substrate located within the interior of the first compartment 42. Once the contents of the first compartment 42 are ignited, combustion gases are configured to flow through the divider 40 to heat and ignited the contents of the second compartment 44.

At least one other surface of the body 22, such as the opposite sidewall 36 and/or the second end wall 30 for example has a plurality of outlet holes 60 formed therein. The outlet holes 60 may be arranged directly adjacent both the first compartment 42 and the second compartment 44. In the illustrated, non-limiting embodiments, the outlet holes 60 are arranged within a single row extending across the second sidewall 36 and the second end wall 30. However, any suitable configuration of the outlet holes 60 is within the scope of the disclosure. The total number of outlet holes 60 may be generally less than the total number of ignition openings 58 and in some embodiments, the size of the outlet holes 60 is greater than the ignition openings 58. The outlet holes 60 are configured to partially choke the airflow through the body 22 to prevent rapid combustion of the material within the module. However, the configuration of the outlet holes 60 must be sufficient to prevent fully choking the airflow which would result in a portion of the contents of the module 20 not combusting or burning.

Figure 3:
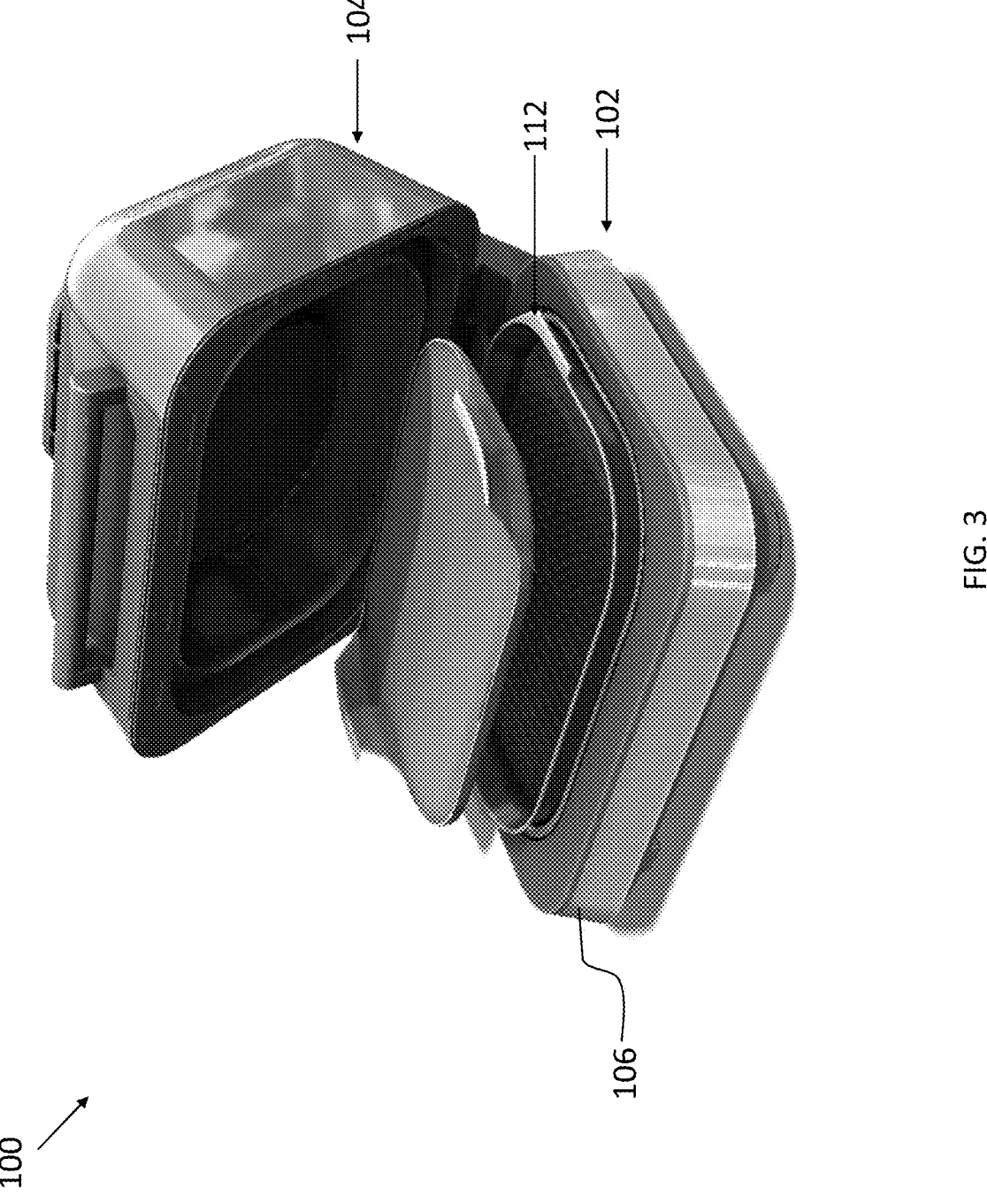
FIG. 3 is a perspective view of a cooking system according to an embodiment.
Figure 4:
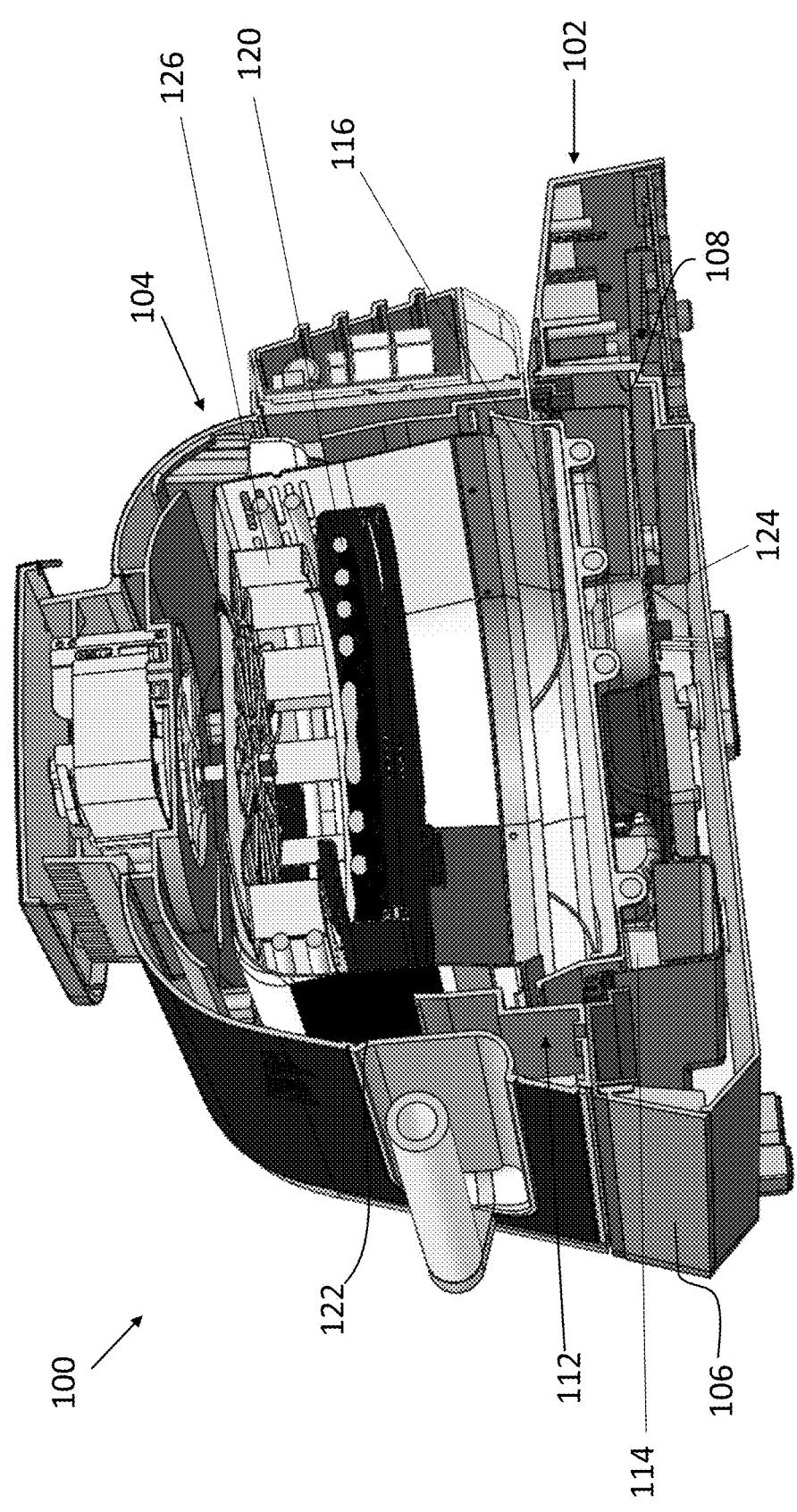
FIG. 4 is a cross-sectional view of the cooking system of FIG. 3 according to an embodiment.

In an embodiment, the combustible substrate module 20 is suitable for use with an electric cooking system 100, such as positionable in at least one cooking mode on a countertop. An example of such a cooking system 100 is illustrated in more detail in FIGS. 3 and 4. As shown, the cooking system 100 includes a base 102 and a lid 104. The base 102 includes a housing 106 made of any suitable material, such as glass, aluminum, plastic, or stainless steel for example. A liner 108 may be disposed within the hollow interior 110 of the housing 106. The liner 108 may be formed from any suitable conductive material, such as aluminum for example. In an embodiment, the liner 108 forms an interior surface of the housing 106 and thereby defines the hollow interior 110 of the housing 106. Alternatively, the liner 108 may be offset from the interior surface of the housing 106. However, it should be understood that other components of the cooking system 100, or surfaces thereof, may also define the hollow interior 110.

In an embodiment, a cooking container 112 is receivable within the hollow interior 110 of the housing 106. Although the cooking container 112 is described herein as being removable from the housing 106 of the base 102, embodiments where the cooking container 112 is integrally formed with the housing 106 are also contemplated herein. The cooking container 112, has an interior 114 designed to receive and retain one or more consumable products, such as food products for example, therein. Examples of food products suitable for use with the cooking system 100, include but are not limited to, meats, fish, poultry, bread, rice, grains, pasta, vegetables, fruits, and dairy products, among others. The cooking container 112 may be a pot formed from a ceramic, metal, or die cast aluminum material. In an embodiment, an interior surface of the cooking container 112 includes a nano-ceramic coating and an exterior surface of the cooking container 112 includes a silicone epoxy material. However, any suitable material capable of withstanding the high temperatures required for cooking food products is contemplated herein. Further, one or more handles (not shown) may be associated with the cooking container 112 to allow a user to easily grasp and manipulate the cooking container 112 relative to the housing 106.

One or more accessories or inserts 116, may be compatible for use with the cooking system 100. Examples of such accessories include, but are not limited to, a diffuser, a crisping insert, a grill plate, and a griddle for example. In such embodiments, the inserts may be receivable within the hollow interior 110 of the housing 106, or alternatively, within the interior 114 of the cooking container 112.

Referring with more detail to the lid 104, it should be noted that the lid 104 is connectable to a surface of the cooking container 112 and/or the housing 106 to close off entry to the interior 114 of the cooking container 112. Accordingly, a cooking volume may be defined between the interior 114 of the cooking container 112 and an end of the closed lid 104, or alternatively, between the hollow interior 110 defined by the housing 106 and the end of the closed lid 104. In an embodiment, a diameter of the lid 104 is generally complementary to a diameter of the housing 106 such that the lid 104 covers not only the cooking container 112, but also an upper surface 118 of the housing 106.

The lid 104 is movable relative to the base 102 between an open position and a closed position to selectively cover the hollow interior 110. For example, the lid 104 may be distinct and separable from the base 102, or the lid 104 may be movably connected to the base 102. In the illustrated, non-limiting embodiment, the lid 104 is pivotable or rotatable relative to the base 102 about a pivot axis P. However, other types or movement of the lid 104 are also within the scope of the disclosure. One or more fastening mechanisms (not shown) may but need not be used to secure the lid 104 to the base 102 when the lid 104 is in the closed position. Any suitable type of fastening mechanism capable of withstanding the heat associated with the cooking system 100 is considered within the scope of the disclosure.

The cooking system 100 includes at least one heating element operable to impart heat to the cooking volume during one or more modes of operation of the cooking system 100. In the illustrated, non-limiting embodiment, a heating element 120 is positioned generally at or above an upper extent 122 of the cooking container 112, such as proximate a center of the interior 114 of the cooking container 112 for example. As shown, the at least one heating element 120 is mounted within the lid 104, and therefore completely outside of the cooking container 112, and vertically offset from the upper extent 122 thereof. Alternatively, or in addition, a heating element 124 may be disposed within the housing 106, generally adjacent the bottom 126 of the cooking container 112. However, it should be understood that embodiments where a heating element is arranged at another location within the base 102 and/or the lid 104 are also contemplated herein.

The at least one heating element 120, 124 may be capable of performing any suitable type of heat generation. For example, a heating element 120, 124 configured to heat the cooking container 112 or one or more food items located within the interior 114 of the cooking container 112 via conduction, convection, radiation, and induction are all within the scope of the disclosure. In the illustrated, non-limiting embodiment, the heating element 120 is operable to cook food within the cooking container 112 via a non-contact cooking operation. As used herein, the term "non-contact cooking operation" includes any cooking operation where a heating element or heat source is not arranged in direct or indirect contact with a food item, such as, but not limited to, convective and radiant heating. In such embodiments, the cooking system 100 additionally includes an air movement mechanism 128, such as a fan for example, operable to circulate air within the cooking volume. The air is heated as it flows along its path of circulation, such as by flowing over a portion of the at least one heating element 120. In the illustrated, non-limiting embodiment, the air movement mechanism 128 is driven by a motor 130 having a separate cooling mechanism (not shown) coupled thereto.

In an embodiment, the heating element 124 is operable to cook food within the cooking container 112 via a contact cooking operation. As used herein, the term "contact cooking operation" includes a cooking operation where heat is transmitted via direct or indirect contact between a heating element or heat source and a food item, such as, but not limited to, conductive and inductive cooking. However, it should be understood that embodiments where the heating element 120 is operable to perform a contact cooking operation and embodiments where the heating element 124 is operable to perform a non-contact cooking operation are also within the scope of the disclosure.

Further, in embodiments including heating element 120 and heating element 124, it should be understood that the heating elements may be operable independently or in combination to apply one or more predetermined power settings to cook the food products within the cooking container. In operation, the heating elements 120, 124 may be capable of cooking the food independent of the loading of the food. In other words, the heating elements 120, 124 may be capable of cooking the food independent of the amount of food within the cooking container 112. The cooking operations that may be performed by the cooking system 100 include but are not limited to pressure cooking, steam cooking, slow cooking, searing, sautéing air frying, broiling, baking/roasting, dehydrating, and grilling.

The combustible substrate module 20 may be mounted within the interior of the cooking system 100 at a position within the path of the convective air flow configured to circulate through the system 100 in response to operation of the air movement mechanism 128. Further, the position of the combustible substrate module 20 may be remote from the cooking surface, such as the surface of a grill plate, an accessory arranged on the grill plate, or alternatively, a surface of the container 112. In the illustrated, non-limiting embodiment, the module 20 is positionable within the interior of the lid 104. However, it should be understood that embodiments where the combustible substrate module 20 is mounted at another location relative to the cooking system 100 are also within the scope of the disclosure. The overall axial height of at least a portion of the combustible substrate module 20 is selected such that when the module 20 is mounted within the cooking system 100, the ignition region 56 of the module is in close proximity to or is in contact with an ignition source, such as a heating element. As shown, the convective heating element 120 arranged within the lid 104 may be used as the ignition source. In such embodiments, the combustible substrate module 20 is arranged radially outward of the heating element 120. Accordingly, the curvature of at least the sidewall 34 including the ignition region 56 that faces the ignition source is complementary to the curvature of the heating element 120 or another component within that region of the lid 104. Embodiments where the ignition source is separate and distinct from the heating elements 120, 124 operable to perform a cooking operation are also contemplated herein.

Figure 5:
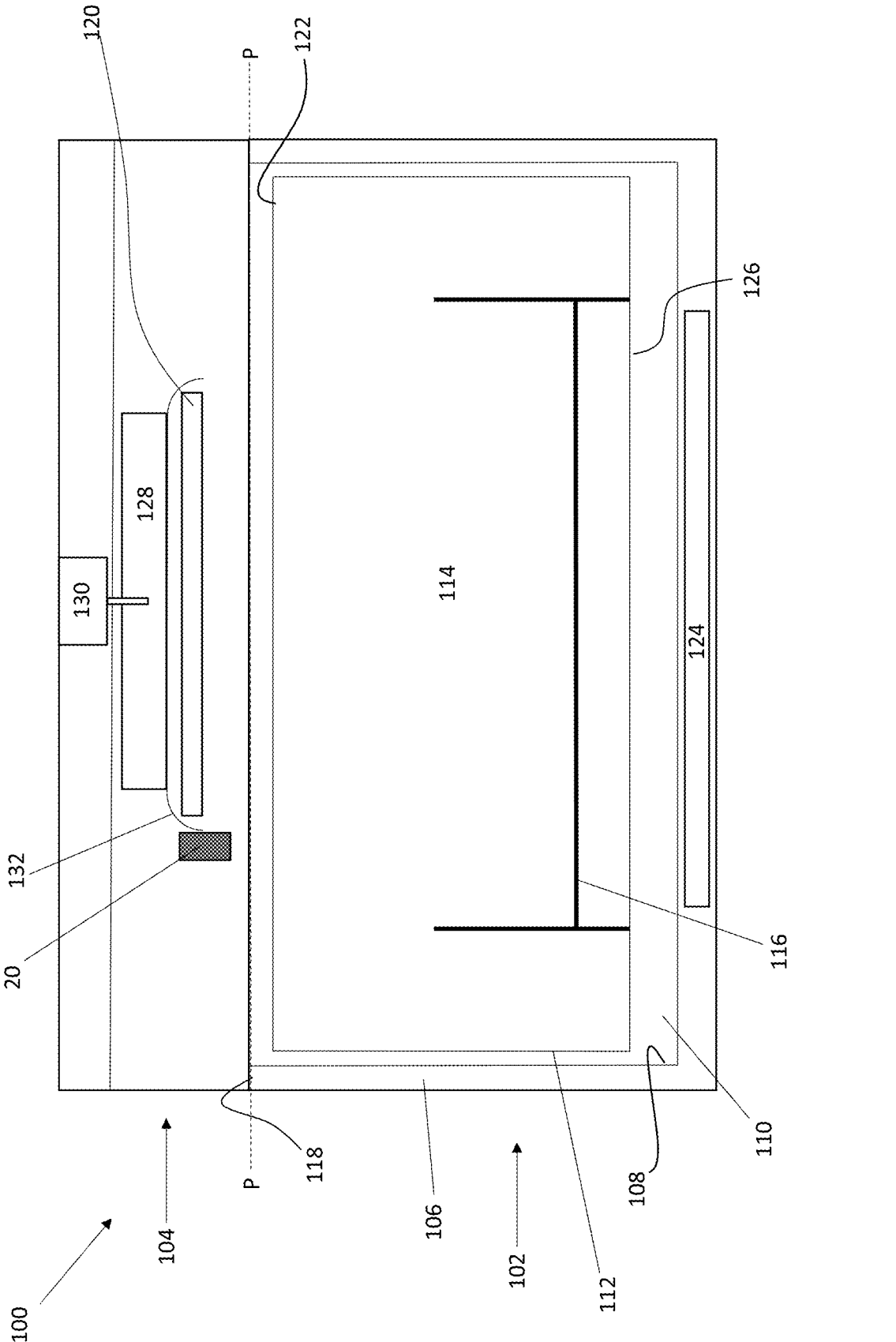
FIG. 5 is a schematic diagram of a cooking system according to an embodiment.
Figure 6:
FIG. 6 is a perspective view of a lid of the cooking system according to an embodiment.
Figure 7:
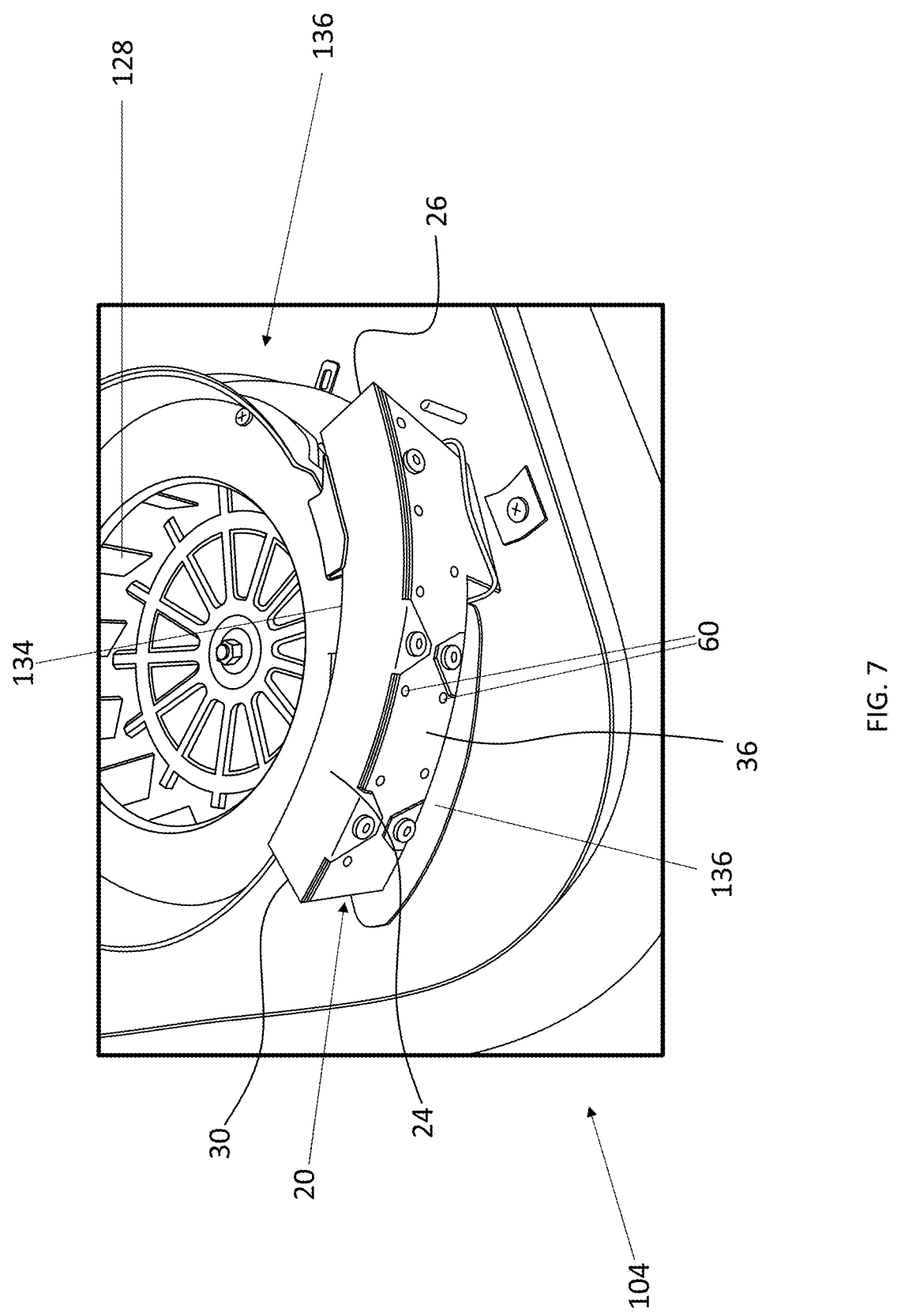
FIG. 7 is a perspective view of a lid of the cooking system having the combustible substrate module mounted therein according to an embodiment.
Figure 8:
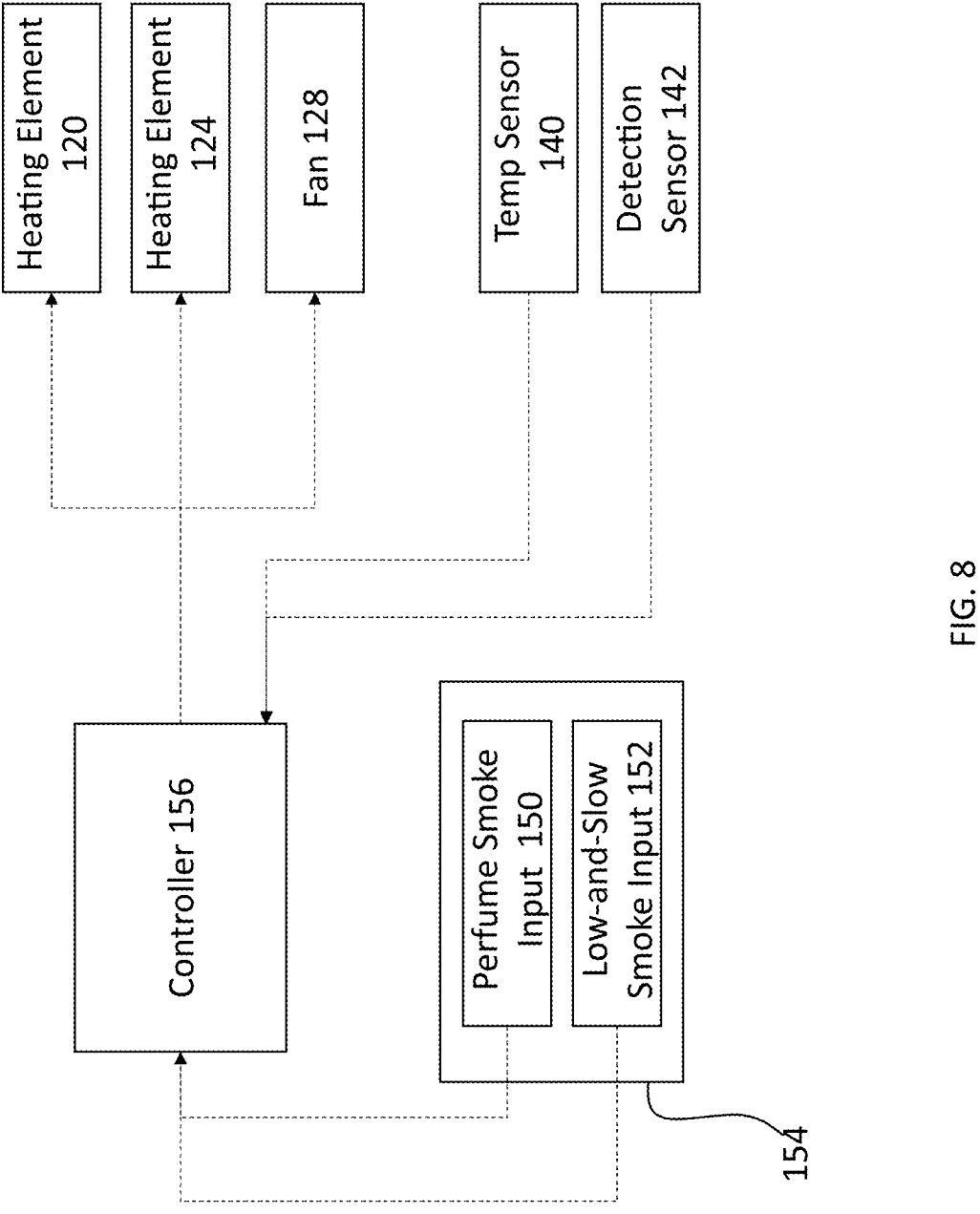
FIG. 8 is a schematic diagram of a control system of the cooking system according to an embodiment.

A radiation shield 132 is arranged between at least a portion of the module 20 and the ignition source. The radiation shield 132 is configured to isolate the substantial entirety of the module 20, except for the ignition region 56, from the ignition source to prevent the contents of the one or more compartments 42, 44 from simultaneously igniting. With reference to FIGS. 5 and 6, an example of a radiation shield 132 is illustrated in more detail. In an embodiment, the radiation shield is a generally cylindrical or dome-shaped shield that surrounds the outer periphery of the heating element. Accordingly, when the combustible substrate module 20 is mounted within the lid 104, the radiation shield 132 is arranged generally concentrically and in between the ignition source and the sidewall 34 of the module 20. An opening 134 is formed in the portion of the radiation shield 132 directly adjacent the ignition region 56 of the module 20 to allow heat from the ignition source to flow through the ignition region 56 and into the first compartment 42 of the module 20. In an embodiment, the radiation shield 132 additionally includes a member 136 protruding from the side of the cylindrical wall towards the module 20. As shown, the member 136 may be configured to extend over the second compartment 44 of the module 20, to form a further heat barrier between the heating element 120 and the upper surface 48 or lid 46 adjacent the second compartment 44.

The cooking system 100 may include a temperature sensor 140 operably coupled to a controller 156. The temperature sensor 140 may be associated with the combustible substrate module 20 and operable to detect when the substrate within the module 20 is burning, and therefore smoke is being generated. In an embodiment, the temperature sensor 140 is arranged in contact with a portion of the module 20, such as a sidewall thereof for example. However, the temperature sensor 140 may be located at any suitable position where the sensor 140 can detect the burning of a substrate in any of the compartments of the module 20. In addition, the temperature sensor 140 is positioned within the cooking system 100 such that the temperature sensor 140 can distinguish between the heat generated by the ignition source and the burning of the substrate within the module 20. In an embodiment, the temperature sensor 140 is a negative temperature coefficient (NTC) temperature sensor. However, any suitable type of temperature sensor 140 is within the scope of the disclosure. Further, the cooking system 100 may additionally include a sensor 142, such as a reed switch for example, operably coupled to a controller 156. In such embodiments, the sensor 142 is operable to detect the presence of the combustible substrate module 20 when installed within the interior of the cooking system 100.

To use the combustible substrate module 20, the contents of one or more of the compartments 42, 44 of the module 20 are filled with a suitable material or substrate. Examples of suitable materials include but are not limited to wood, such as hickory, alder, and mesquite wood in a variety of forms including chips, briquettes, pellets, and saw dust, and charcoal. Once filled, the module 20 is installed within the cooking system 100 adjacent the ignition source. The module 20 may be mounted within the cooking system 100 via any suitable mechanism. For example, in an embodiment, the module 20 may be connectable to the radiation shield 132 or another portion of the lid 104 via a snap fit connection.

To perform a cooking operation using the system 100, a user selects one of a perfume smoke related input 150 and a low-and-slow smoke related input 152 via a user interface 154 of the cooking system 100. For perfume smoke applications, only the first compartment 42 of the combustible substrate module 20 is filled with a combustible material. However, for low-and-slow smoke applications, both the first compartment 42 and the second compartment 44 are filled with such a material. These compartments 42, 44 may be filled with the same materials, or alternatively, with different materials.

After the cooking operation has been selected, the ignition source used to initiate combustion within the module 20 is energized. In embodiments where the cooking system 100 includes a dedicated ignition heater, separate from the cooking heating elements 120, 124, the ignition heater will selectively activate during a preheating stage of the cooking operation in response to detection of the module within the cooking system 100, such as by sensor 142. Once activated, the ignition heater is energized until the temperature sensor 140 detects that ignition of the material within the module 20 has occurred. Accordingly, in response to detection that ignition has occurred, the controller 156 will cease to provide energy to the ignition source. Further, in an embodiment, the ignition heater will not be energized after the preheating stage of the cooking operation, regardless of whether or not the sensor 142 has detected ignition of the material within the module 20.

Alternatively, if one of the heating elements 120, 124 is configured as the ignition source, the cooking system 100 will perform a preheating operation to achieve a temperature sufficient to initiate ignition of the material within the first compartment 42 before dropping to the target temperature selected by the user. In an embodiment, the heating element is energized to preheat the interior of the cooking system 100 to at least 500° F. to initiate ignition of the material within the module 20.

In response to the application of heat, the contents of the compartment 42 will ignite and therefore generate smoke. once the ignition source is energized, the heat will permeate through the ignition source and into the first compartment. The smoke generated by the burning material is configured to permeate through the outlet holes 60 formed therein and flows into the interior 114 of the cooking container 112 or into the cooking volume where one or more food items are located.

For perfume smoke related operations, once the material within the first compartment 42 has ignited, the material will continue to burn as a selected cooking operation is performed. It should be understood that the during the selected cooking operation, any of the heating elements 120, 124 and/or air movement mechanism 128 may be energized. In an embodiment, during a perfume smoke related operations the contents of the first compartment 42 will produce smoke for about 10 minutes, or in some embodiments, for at least 10 minutes or between 10-20 minutes, such as about 12 minutes, about 14 minutes, about 16 minutes, about 18 minutes, and about 20 minutes. The length of time that smoke is produced from the material in the first compartment 42 will vary based on the cooking temperature selected and the food being cooked.

In embodiments where a user has selected a low-and-slow smoke related cooking operation, the material within the first compartment 42 is ignited, and this ignition is transferred to the material within the second compartment 44. In an embodiments, the ignition of the material within the second compartment 44 may occur so rapidly that the ignition of the material in both compartments 42, 44 may be considered to occur substantially simultaneously. However, embodiments where ignition of the material within the second compartment 44 is delayed related to the ignition of the material within the first compartment 42 are also contemplated herein. In such embodiments, the material within the first compartment 42 and the material within the second compartment 44 are ignited sequentially. Once ignition within the module 20 has been detected, such as by the temperature sensor 142, operation of the air movement mechanism 128 is initiated. Rotation of the air movement mechanism 128 about its axis will cause air to circulate to and from the cooking volume. In an embodiment, the air output from the air movement mechanism 128 is configured to flow across or around the combustible substrate module 20. As a result of this air flow, a portion of the smoke within the combustible substrate module 20 or permeating out of the module 20 may be drawn into or entrained within the flow of air configured to circulate about an exterior surface of the food items within the cooking system 100.

In an embodiment, the air movement mechanism 128 is configured to rotate at low speeds. The controller 156 operably coupled to the air movement mechanism 128 may be configured to control the speed of the air movement mechanism 128 to modulate the burn rate of the material within the module 20, such as in response to the temperature detected by the sensor 140. For example, when the fan speed is increased, the additional oxygen provided to the interior of the module 20 will increase the burn temperature, and when the fan speed is reduced or stopped, the oxygen within the interior of the module 20 is reduced, thereby lowering the burn temperature. The fan speed may be altered between two or more speeds during a low-and-slow smoke operation to extend the length of time that the contents of the module 20 are burning for as long as possible while generating smoke that is hot enough to yield the desired culinary results. In an embodiment, the temperature of the smoke generated during a low-and-slow operation is between 200° F. and 250° F.

In operation, the temperature sensor 140 may be used to detect when the material within the module 20 has completely combusted. For example, when the sensor 140 fails to detect the heat associated with burning of the material of the module 20 even when the fan speed is increased, it can be determined that all material burning within the module 20 has been extinguished.

A low-and-slow smoke operation may be combined with another cooking operation of the cooking system 100. In such embodiments, the other cooking operating may be initiated once the sensor 142 has determined that the material within the module 20 is fully extinguished. For example, once the cooking system 100 has detected that the material within the module 20 is no longer generating smoke, a convective cooking operation using the heating element 120 and the air movement mechanism 128 may be automatically initiated. Such a secondary cooking operation may be performed for a set amount of time, may be performed to finish cooking the food, or may be performed to bring the food to a desired temperature. Once a cooking operation is complete, the combustible substrate module 20 may be removed from the cooking system 100, and the burned contents of the module 20 may be discarded.

A cooking system 100 configured to receive a combustible substrate module 20 as illustrated and described herein is configured to enhance the variety of flavors attainable via the cooking system. In addition, different types of flavors may be imparted to the food based on the type of smoke generating items installed within the compartments 42, 44 of the combustible substrate module 20. As a result, the cooking system 100 provides an enhanced user experience.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A cooking system comprising:
   a housing including a lid hinged to a base, the housing having a hollow interior;
   a first heating element disposed on the lid within said hollow interior, said first heating element being operable to heat to said hollow interior;
   a fan disposed on the lid within the hollow interior and adjacent the first heating element, the fan being operable to circulate heated air within the hollow interior;
   a food support surface arranged within said hollow interior beneath the first heating element and the fan;
   a second heating element disposed beneath the food support surface, said second heating element being operable to heat the food support surface; and
   a combustible substrate module coupled to the lid;
   wherein when positioned in said housing, said combustible substrate module is arranged in fluid communication with said hollow interior, and
   wherein when said combustible substrate module is positioned in said housing, said combustible substrate module is disposed remote of said food support surface.

2. The cooking system of claim 1, wherein the first heating element is configured to ignite a combustible material disposed within said combustible substrate module.

3. The cooking system of claim 2, wherein the first heating element is spaced separately from said combustible substrate module.

4. The cooking system of claim 2, further comprising a radiation shield arranged between said first heating element and said combustible substrate module, said radiation shield having an opening located directly adjacent said first heating element of said combustible substrate module.

5. The cooking system of claim 1, wherein said combustible substrate module further comprises a body including a cavity.

6. The cooking system of claim 5, further comprising at least one divider arranged within said cavity to define a first compartment and a second compartment, said divider including a plurality of openings such that said first compartment and said second compartment are arranged in fluid communication via said plurality of openings.

7. A cooking system comprising:
   a housing having a hollow interior;
   a heating element disposed within said hollow interior, said heating element being operable to heat to said hollow interior;

a fan disposed within the hollow interior and adjacent the heating element, the fan being operable to circulate heated air within the hollow interior;

a food support surface arranged within said hollow interior beneath the heating element and the fan;

a combustible substrate module coupled to said housing, said combustible substrate module being configured to retain ignited fuel;

an ignition source arranged within said housing and operably coupled to said combustible substrate module; and a temperature sensor disposed within the housing, the temperature sensor being configured to detect an ignition status of the fuel disposed within the combustible substrate module, wherein, in response to ignition being detected within the combustible substrate module, the ignition source is configured to be de-energized and the fan is configured to be energized.

8. The cooking system of claim 7, wherein said temperature sensor is configured to distinguish between heat generated by said ignition source and heat generated by said ignition within the combustible substrate module.

9. The cooking system of claim 7, wherein said ignition source is energized in response to determining that the fuel within said combustible substrate module has fully combusted.

10. The cooking system of claim 7, wherein operation of said heating element is controlled in response to a status of said ignited fuel.

11. The cooking system of claim 10, wherein said heating element is energized in response to determining that said fuel within said combustible substrate module is ignited.

12. The cooking system of claim 10, wherein said heating element is energized in response to determining that said fuel within said combustible substrate module has fully combusted.

* * * * *